Nov. 2, 1965   W. T. ACKERMANN   3,215,238
ORIENTING ARTICLES OF MANUFACTURE
Filed Oct. 30, 1963   2 Sheets-Sheet 1
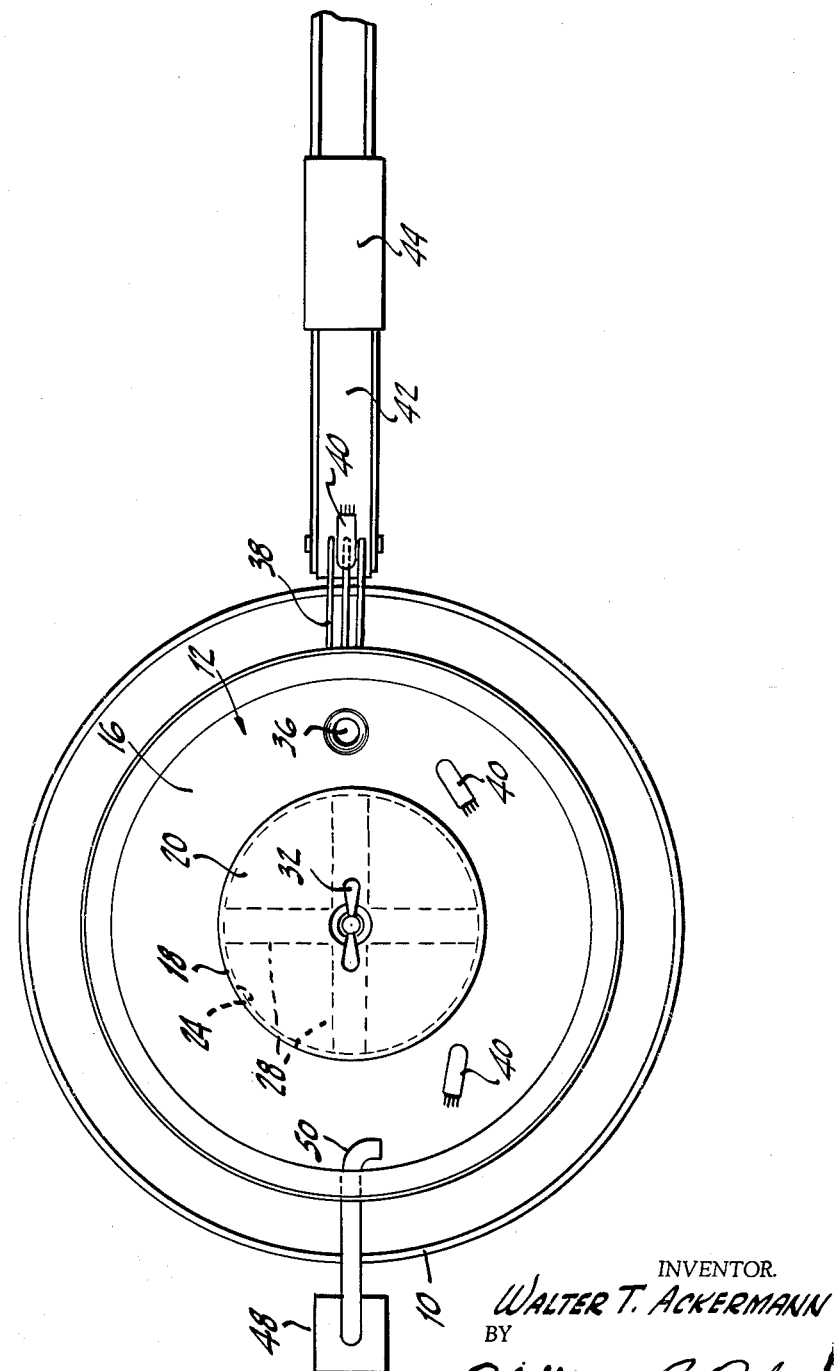
INVENTOR.
WALTER T. ACKERMANN
BY
William A. Zalesak
ATTORNEY

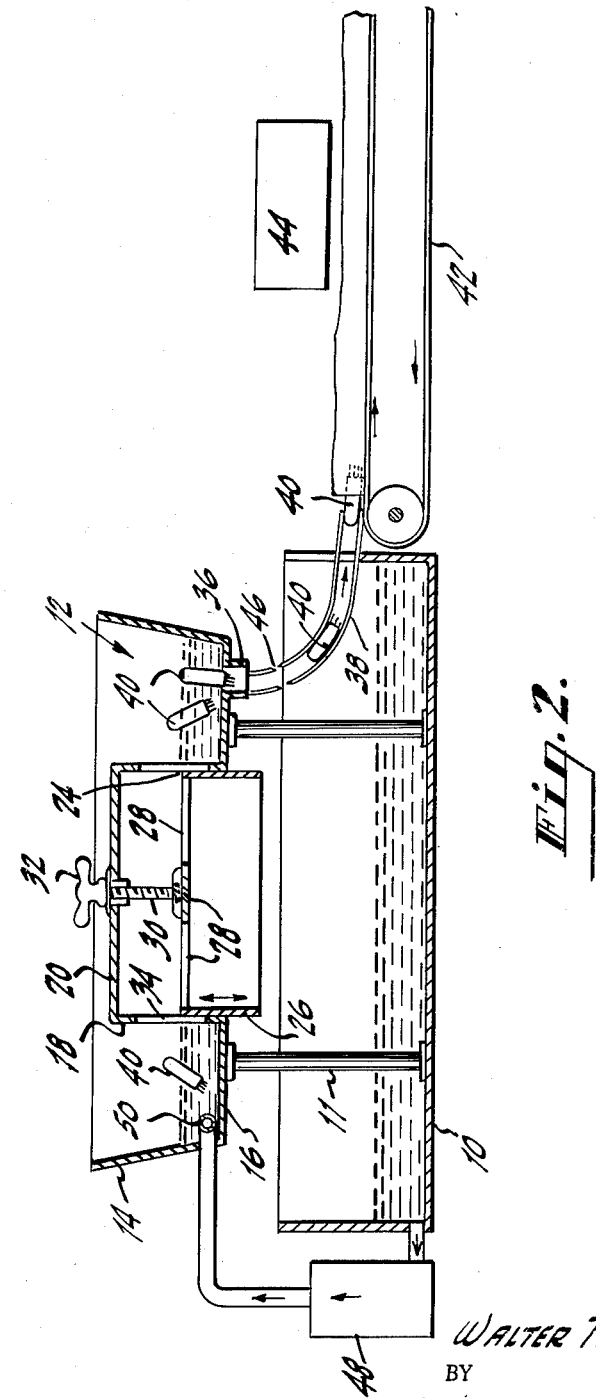

3,215,238
ORIENTING ARTICLES OF MANUFACTURE
Walter T. Ackermann, Millington, N.J., assignor to Radio
Corporation of America, a Delaware corporation
Filed Oct. 30, 1963, Ser. No. 320,056
1 Claim. (Cl. 193—43)

This invention relates to the handling of articles of manufacture and particularly to a method of orienting articles of manufacture.

This invention has utility in the orientation of a large variety of objects. However, the invention will be described in connection with the orientation of electron discharge tubes.

During the mass production of electron discharge tubes it frequently occurs that large numbers of tubes are temporarily bulk stored. The tubes are randomly disposed within the storage means. Prior to the performance of further operations on the tubes, such as testing, packaging, and the like, the tubes are longitudinally and endwise oriented, that is, they are disposed with the same end leading. There is a need, therefore, in the manufacture of electron discharge tubes, as well as in the manufacture of many other articles, for means for rapidly and inexpensively longitudinally orienting large numbers of randomly disposed workpieces.

It is an object of this invention to provide a new and novel method for a rapidly and inexpensively orienting workpieces.

A further object of this invention is to provide a new and novel method for rapidly and inexpensively longitudinally orienting elongated articles.

It has been found that almost all types of electron discharge tubes will float in water, and further, that the same end of each tube, depending upon the tube type, will float somewhat higher than the other end thereof. That is, each tube will float in a predetermined vertical or tilted endwise orientation.

The method of this invention, as exemplified in one embodiment, comprises floating a plurality of tubes of a given type in a container of liquid, such as water, the liquid preferably being maintained at a level only slightly higher than the submerged length of the tubes being oriented. The liquid is caused to flow through a vent leading to a receiving chute. The floating tubes travel with the liquid with the same end of each tube leading, and as the liquid flows through the vent, the tubes are discharged into the chute. Each of the tubes enters the receiving chute in a predetermined longitudinal orientation. The liquid may then be drained from the tubes and receiving chute and recirculated into the container.

Since electron tubes are vacuum sealed, the immersion of the tubes in the water is not harmful to the tubes. With respect to other articles of manufacture which float in one particular orientation in a liquid, the method of this invention may be used by utilizing such a liquid in which the articles will float and in which they are not injured.

A more detailed description of the invention will be given in connection with the drawings wherein:

FIG. 1 is a top plan view of the apparatus shown in FIG. 2; and

FIG. 2 is a side elevation, partly in section, of an apparatus which may be used in the practice of the method of this invention.

With reference to the drawings, an apparatus which may be utilized for endwise orienting electron tubes according to the method of this invention comprises a reservoir 10 for storing and receiving a liquid in which the tubes will float. Water is preferably used. Mounted on suitable supports 11 secured to the bottom of reservoir 10 is an article floating and orienting container 12. Container 12 is annular and comprises an outer wall 14, a bottom 16, an inner wall 18, and a covering plate 20 connected to inner wall 18. Slidably mounted within inner wall 18 is a water level regulator 24 which comprises an open cylinder 26 having a pair of cross straps 28 secured across the top end thereof to which a rod 30 is secured. Rod 30 extends upwardly through cover plate 20 and terminates in a handle 32. Rod 32 is threaded through plate 20, and the height of cylinder 26 within inner wall 18 may be adjusted by turning handle 32. Inner wall 18 is provided with a number of spaced slots 34 therethrough permitting passage of excess water from container 12 into and through cylinder 26 and into reservoir 10. By raising or lowering cylinder 26, the water level within container 12 may be regulated.

Container 12 is provided with a discharge vent 36 which leads to an electron tube receiving chute 38. Vent 36 preferably has a diameter smaller than the length of the tubes being oriented. Chute 38 may conveniently consist of three parallel rods in triangular arrangement. The tubes 40 are discharged through vent 36 and are conveyed along the chute 38 by gravity to a conveyor 42 which carries the tubes 40 in proper endwise orientation to a tube operating station, not shown. For drying the tubes, a hot air dryer 44 may be provided mounted over the path of the tubes along conveyor 42.

Since chute 38 consists of three spaced rods, the water flowing through vent 36 will drain between the rods of the chute and fall into reservoir 1. For preventing flow of water along the rods forming the chute, it is convenient to provide a small break or gap 46 in the rods through which the water may drop.

For transferring the water from reservoir 10 into container 12, a pump 48 is provided. As shown in FIG. 1, the discharge pipe 50 from pump 48 extends angularly or tangentially into container 12. The effect of this is to provide a circular flow or current of water around container 12. One purpose of this circular current is to cause a more rapid movement of the tubes 40 in container 12 towards and through the discharge vent 36 than would be caused by only the flow of water through vent 36.

During the operation of the described apparatus, pump 48 operates continuously to pump water from reservoir 10 into container 12. A number of randomly oriented tubes 40 are placed into container 12, and, as shown in FIG. 2, float with their pin ends lower than the dome end of the tubes. Water is pumped into container 12 faster than it can discharge through vent 36, and the level of water is adjusted by means of regulator 24 to provide a water depth which is preferably only slightly greater than the submerged length of the tubes.

The circular current produced by discharge pipe 50, as described, causes the tubes to travel rapidly around the container 12. The water in the container 12 constantly discharges through vent 36, and as the tubes travel over the discharge vent, the suction produced by the water flowing through the vent sucks the tubes downwardly through the vent and into chute 38. Vent 36 is of such size that only one tube can pass therethrough at a time.

The horizontal current of water prevents the formation of a whirlpool at the discharge vent, whirlpools often being formed when a fluid is discharged through a drain, as known. It is found that if such a whirlpool is allowed to form over the discharge vent 36, the tubes tends to flow around the vent under the influence of the whirlpool rather than pass through the discharge vent. By providing a sufficiently strong horizontal current of water, any whirlpools which form at the vent are dissipated by the current flow. Turbulent current flow should be avoided, however, since turbulence of the water in which the tubes are floating may disturb the desired orientation of the tubes.

It has been found that if the level of the water in container 12 is significantly greater than the submerged length of the tubes 40, the tubes will float over and pass the vent 36 without being sucked therethrough. Conversely, if the water level is so low that the pins of the tubes drag along the bottom 16 of container 12, an excessive tilt of the tubes results which may cause the tubes to be discharged through vent 36 wrong end first, or not at all. Also, dragging of the tubes reduces the rate at which the tubes can be oriented and discharged.

Although container 12 is shown with one discharge vent 36 and a corresponding receiving chute 38, it is clear that a plurality of discharge vents and chutes may be provided spaced around the bottom of container 12. The capacity of the apparatus is dependent upon the number of discharge vents and chutes, and upon the rate of flow of the water. The proper rate of water may be readily determined by a trial and error process.

In one apparatus for performing the method of this invention in which tubes known as "miniature" tubes are oriented (that is, tubes having a diameter of around ⅞ inch and a length up to 3 inches), the outer and inner diameters of the liquid container 12 are 20 and 8 inches, respectively, four discharge vents 36 are provided each having a diameter of 1 inch, and each vent leading to a receiving chute 38, and pump 48 pumps water into container 12 at about 40 gallons per minute. The capacity of such apparatus is over 4,000 tubes per hour.

What is claimed is:

A method of longitudinally orienting articles having the characteristic of floating in a liquid in a particular endwise orientation, comprising:
 floating said articles in said liquid within a container having a discharge vent disposed below the level of said liquid, whereby liquid and articles carried by said liquid are discharged through said vent,
 maintaining the level of said liquid in said container at a depth slightly greater than the submerged length of said articles, and
 causing some of said liquid to flow past said vent at a rate sufficient to prevent the formation of whirlpools at said vent.

References Cited by the Examiner

UNITED STATES PATENTS

| | | | |
|---|---|---|---|
| 1,967,229 | 7/34 | Drevitson | 17—2 |
| 2,572,773 | 10/51 | Slagle | 198—33 |

FOREIGN PATENTS

| | | |
|---|---|---|
| 75,934 | 8/50 | Norway. |

SAMUEL F. COLEMAN, *Primary Examiner.*

WILLIAM B. LABORDE, *Examiner.*